United States Patent
Akita

(10) Patent No.: US 8,205,320 B2
(45) Date of Patent: Jun. 26, 2012

(54) METHOD OF MANUFACTURING A ROTATING ELECTRIC MACHINE

(75) Inventor: Hiroyuki Akita, Tokyo (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 205 days.

(21) Appl. No.: 12/275,012

(22) Filed: Nov. 20, 2008

(65) Prior Publication Data

US 2009/0134739 A1    May 28, 2009

(30) Foreign Application Priority Data

Nov. 22, 2007 (JP) ................................. 2007-303400

(51) Int. Cl.
*H02K 15/00* (2006.01)
(52) U.S. Cl. ............... 29/596; 29/598; 29/605; 29/606; 29/609
(58) Field of Classification Search .............. 29/596, 29/598, 605, 606, 609; 310/71, 216.004, 310/216.011, 216.059, 216.1; 336/212, 234
See application file for complete search history.

(56) References Cited

U.S. PATENT DOCUMENTS

| | | | |
|---|---|---|---|
| 6,323,571 B1 * | 11/2001 | Nakahara et al. | 310/71 |
| 6,369,687 B1 | 4/2002 | Akita et al. | |
| 6,538,548 B2 | 3/2003 | Akita et al. | |
| 2006/0279160 A1 | 12/2006 | Yoshinaga et al. | |

FOREIGN PATENT DOCUMENTS

| | | |
|---|---|---|
| JP | 5-3648 A | 1/1993 |
| JP | 09-37492 A | 2/1997 |
| JP | 3316762 B1 | 6/2002 |
| JP | 3461552 B2 | 8/2003 |
| JP | 2004-350369 A | 12/2004 |
| JP | 2005-318763 A | 11/2005 |
| JP | 2005-341684 A | 12/2005 |
| JP | 2007-020386 A | 1/2007 |

OTHER PUBLICATIONS

Hiroyuki Akita et al., "Study on the Manufacturing Method of the Motor Cores to Reduce the Cogging Torgue", Precision Engineering Magazine, Mar. 21, 2007, vol. 73, No. 6, pp. 711-716.
Japanese Office Action dated Mar. 6, 2012 issued in the corresponding Japanese Patent Application No. 2007-303400.

* cited by examiner

*Primary Examiner* — Thiem Phan
(74) *Attorney, Agent, or Firm* — Buchanan Ingersoll & Rooney PC

(57) ABSTRACT

There is provided a rotating electric machine capable of reducing torque pulsation, even when a slight stepped portion is present in an inner diameter shape of a stator core formed by allowing split cores divided in every magnetic pole to be in an annular shape. The stator core is formed by stacking a plurality of laminates prepared by stack of split core members formed by punching steel sheets and arranged in an annular shape in a state where the laminates are rotated one another by a predetermined angle. With such a configuration, it is possible to mutually offset torque pulsation components caused by the shape asymmetry of the laminates and reduce the torque pulsation components of the stator core on the whole.

12 Claims, 10 Drawing Sheets

Fig. 11A  Fig. 11B  Fig. 11C
VECTOR OF FIRST GROUP 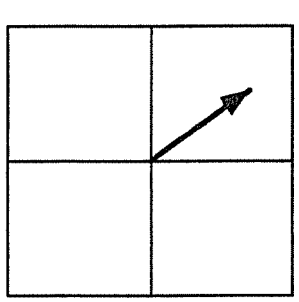
VECTOR OF SECOND GROUP 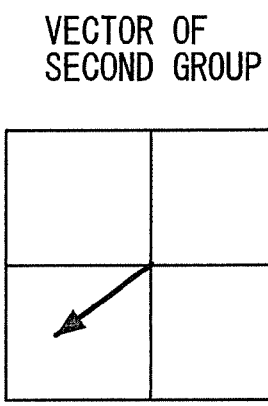
VECTOR OF ENTIRE LAMINATES 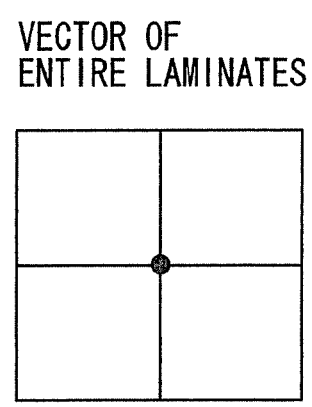
Fig. 12A  Fig. 12B
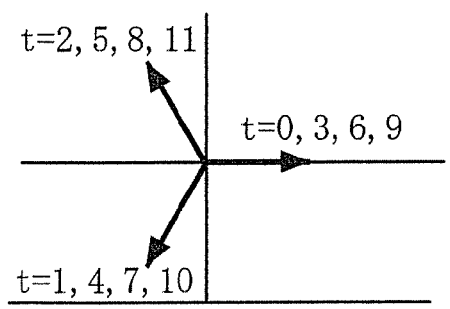
8 POLES AND 12 SLOTS
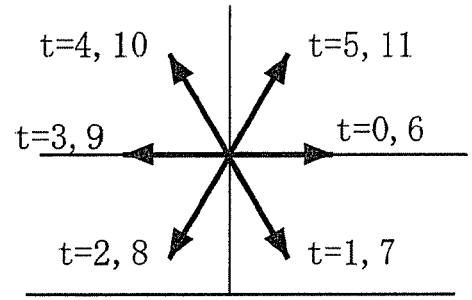
10 POLES AND 12 SLOTS

RELATION BETWEEN STEPPED PORTION AND TORQUE PULSATION

VECTOR OF
FIRST GROUP

VECTOR OF
SECOND GROUP

VECTOR OF
ENTIRE LAMINATES

METHOD OF MANUFACTURING A ROTATING ELECTRIC MACHINE

BACKGROUND OF THE INVENTION

1. Field of the Invention

The present invention relates to a rotating electric machine capable of suppressing torque pulsation and a method of manufacturing the rotating electric machine and particularly to split cores mainly used for improvement in motor efficiency or productivity.

2. Description of the Related Art

Split cores are formed by punching steel sheets with a press mold to prepare split core members, stacking the plurality of split core members, fixing the stacked split core members by caulking, as disclosed in Patent Document 1 [Japanese Patent No. 3461552 (third page and FIG. 1)]. A stator core is prepared by winding a coil around magnetic pole teeth (magnetic tooth portions) of the split cores with insulation sheets interposed therebetween, assembling the coiled split cores in an annular shape, and fixing the split cores assembled in the annular shape within a frame.

Since the coil is wound in a state where the split cores are separated, the coil can be wound with high density without a waste of a space through which a nozzle winding the coil passes, compared to a coil wound around an integrated core which is not divided. Accordingly, it is possible to improve torque thanks to an increase in the number of wound coils or to reduce the electroresistance caused upon mounting coils having a larger cross-section area, thereby improving motor torque or performance such as efficiency.

There has been increased a demand for reducing torque pulsation in order to improve accuracy or comfortableness in a driving motor used for a machine tool, an electrically-driven power steering of a passenger car, and an elevator, for example. The torque pulsation is caused by various factors such as an error in an inner circumferential shape of a stator core, a declination of magnetoresistance of a stator core, a declination of a magnetomotive force of a rotor, and a shaft deviation between a stator and a rotor.

When the annular stator core is obtained by assembling the split cores, boundaries of the split cores come in contact with each other to determine the respective positions of the split cores one another. However, a small stepped portion occurs in the inner circumferential shape of the split cores due to an error in process accuracy or assembly of the split cores. When the small stepped portion exists in the inner circumferential shape of the split cores, permeance of a magnetic path formed between a stator and a rotor is locally increased. Therefore, a problem occurs in that the torque pulsation increases.

In order to improve the assembly accuracy of the split cores, there were carried out studies in which positioning concave and convex portions are formed in a contact portion with the adjacent split cores in a radial direction or the inner circumference is pushed against a cylindrical spindle to assemble the split cores. However, the assembly accuracy determined by the process accuracy such as a punching error of split core members is not sufficient to suppress the torque pulsation. Moreover, when a request for the reduction of the torque pulsation is strict, a machining accuracy has to be further improved or grinding and finishing on the inner circumference are necessary after the assembly. Therefore, a problem occurs in that manufacture cost increases.

A steel sheet has magnetic anisotropy in which magnetoresistance is different in a rolling direction and a direction perpendicular to the rolling direction. Therefore, when the split cores are arranged to be integrally punched, the magnetoresistance is not uniform according to a direction of magnetic pole tooth portions. For that reason, a problem occurs in that the torque pulsation increases even though there is no error caused in processing and assembling.

The torque pulsation occurring due to the shape of a stator core or a material characteristic is caused by magnetic asymmetry in which the magnetoresistance between a stator core and a rotor core opposite the stator core is distributed unevenly in a stator circumferential direction.

SUMMARY OF THE INVENTION

An object of the invention is to provide a rotating electric machine capable of reducing torque pulsation caused by presence of a magnetic asymmetric property in a stator core formed with split cores assembled in an annular shape.

According to an aspect of the invention, in a method of manufacturing a rotating electric machine, a rotor is formed by fixing a rotor core having p number of magnetic poles around a shaft which is a rotational axis, m number of split cores are formed by stacking a plurality of split core members each of which includes a york portion and a magnetic pole tooth portion protruding from the york portion inward in a radial direction, and a stator is formed by winding a coil around the respective split cores to be arranged in an annular shape around an outer circumference of the rotor. The m number of split cores are formed by punching m number of split core members from steel sheets in an annularly arranged shape, stacking the punched split core members by a predetermined thickness while maintaining the annularly arranged shape to form n number of (where n≧2) annularly arranged laminates, matching an i-th annularly arranged laminate among the n number of annularly arranged laminates with a first annularly arranged laminate at a location of the magnetic pole tooth portions in its circumferential direction, and stacking the i-th annularly arranged laminate in a state where the i-th annularly arranged laminate is rotated by a predetermined angle αi (where 0<αi<2π and i=2 to n) with respect to the first annularly arranged laminate. In addition, the stator is formed by arranging the m number of split cores formed in this manner in the annularly arranged shape in stack of the annularly arranged laminates.

According to another aspect of the invention, a rotational electric machine includes a rotor including a shaft as a rotational axis and a rotor core with a plurality of magnetic poles fixed around the shaft and a stator formed by winding a coil around a plurality of split cores formed by stack of a plurality of split core members which each include a york portion and a magnetic pole tooth portion protruding from the york portion inward in a radial direction and arranging the split cores around an outer circumference of the rotor in an annular shape. The annularly arranged split cores are formed by stacking n number of annularly arranged laminate formed by stack of the split core members by a predetermined thickness in its stack direction. In addition, the n number of annularly arranged laminates have a common shape asymmetry, and an i-th annularly arranged laminate is matched with a first annularly arranged laminate at a location of the magnetic pole tooth portions in its circumferential direction and stacked in a state where the i-th annularly arrange laminated is rotated by a predetermined angle αi (where 0<αi<2π and i=2 to n) with respect to the first annularly arranged laminate for the characteristic of the shape asymmetry.

In the rotating electric machine according to the invention, the stator core is constituted by the plurality of split cores of which the adjacent ends come in contact with each other and the stator core is formed by rotating and stacking the plurality of laminates. With such a configuration, it is possible to increase a coil occupation ratio and allow the phase of the torque pulsation components, which occur due to deformation of the inner circumference shape of the stator core, such as the stepped portion between adjacent tooth portions and the magnetic anisotropy of the steel sheet as a base material in a punching for the stator core, to be different in every laminate. Accordingly, by allowing the phases in every laminate to have a predetermined relation by rotational stack, it is possible to offset the torque pulsation components in every laminate on the whole and reduce the torque pulsation components.

The foregoing and other objects, features, aspects and advantages of the present invention will become more apparent from the following detailed description when read in conjunction with the accompanying drawings.

BRIEF DESCRIPTION OF THE DRAWINGS

FIGS. 11A, 11B, and 11C are diagrams illustrating a vector of the torque pulsation in which torque pulsation components by the shape are inverse phases one another in the first group and the second group and have an equal magnitude.

FIG. 12A is a diagram illustrating a direction of a torque vector allowed when slot locations are matched in a case of eight poles and twelve slots. FIG. 12B is a diagram illustrating a direction of a torque vector allowed when slot locations are matched in a case of ten poles and twelve slots.

DETAILED DESCRIPTION OF THE PREFERRED EMBODIMENTS OF THE INVENTION

First Embodiment

Figure 1:
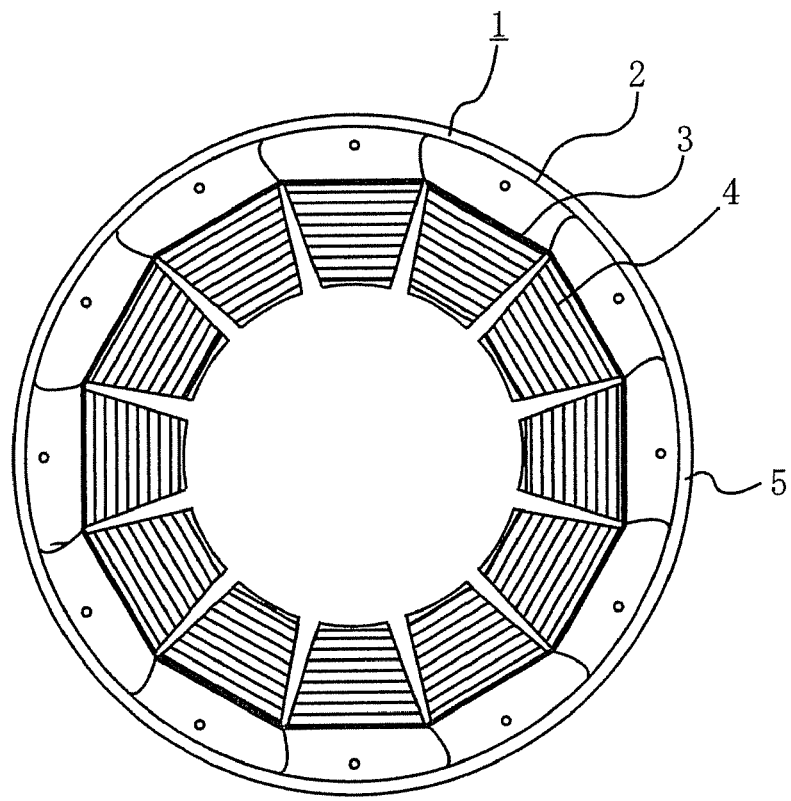
FIG. 1 is a plan view illustrating a first embodiment of a stator formed by split cores of a rotating electric machine according to the invention.

FIG. 1 is a plan view illustrating a stator formed by split cores of a rotating electric machine according to a first embodiment of the invention. FIG. 1 shows that twelve magnetic poles as an example, but the invention is not limited thereto. In FIG. 1, Reference Numeral 1 denotes a stator core, Reference Numeral 2 denotes a split core, and a york portion split in respective twelve teeth and a tooth portion protruding from the york portion inward in a radial direction of the stator are shown. Reference Numeral 3 denotes a wound frame made of an insulation resin material and covering the tooth portion and a coil 4 is wound in the tooth portion through the wound frame. In the stator core 1, twelve wound split cores 2 are arranged in an annular shape and end portions thereof come in contact with each other in a circumferential direction. A frame 5 is mounted around the outline of the stator core 1.

Figure 2:
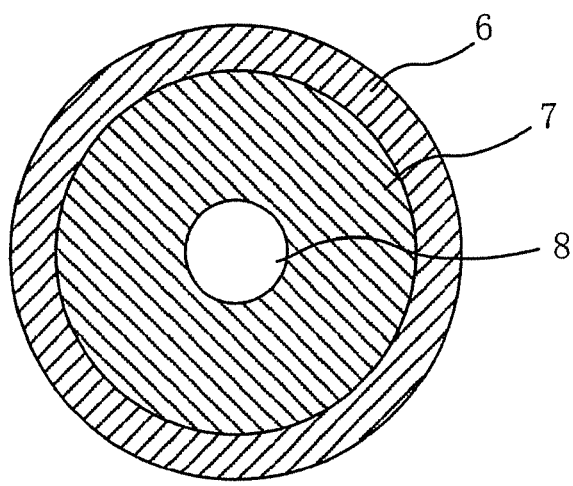
FIG. 2 is a sectional view illustrating a rotor to which a magnet is attached in the rotating electric machine according to the invention.

FIG. 2 is a sectional view illustrating a rotor to which a magnet is attached in the rotating electric machine according to the invention. As shown in FIG. 2, the rotor includes a ring-shaped magnet 6 which is provided around the outline of a rotor core 7 and a shaft 8 which is a rotational axis of the rotor at the center of the rotor core 7. The rotor core 7 has a structure in which steel sheets are stacked like the stator. The rotor is joined inside the stator 1 shown in FIG. 1 to form the rotating electric machine.

Figure 3A:
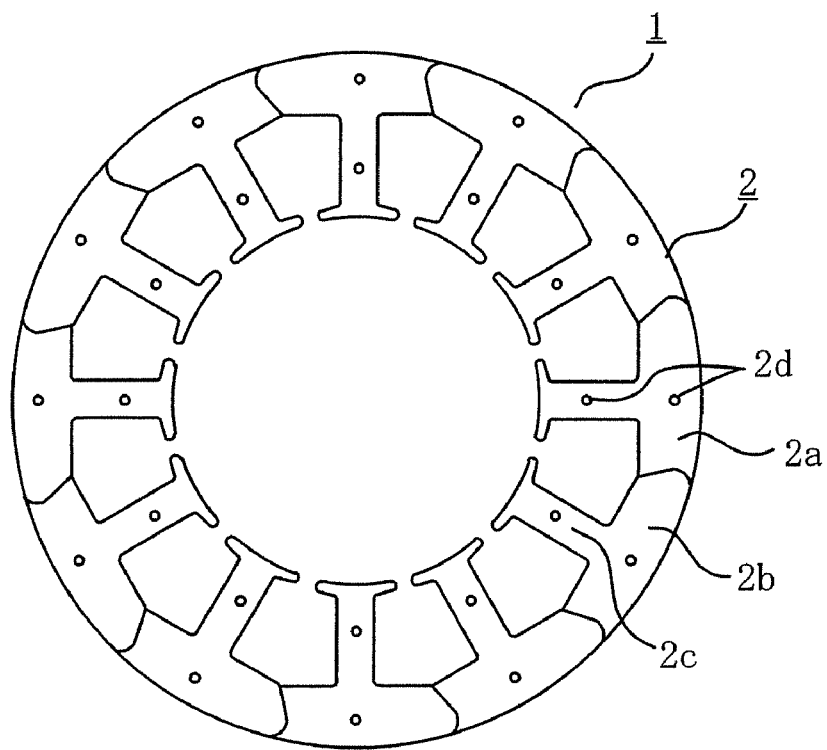
FIGS. 3A and 3B are a plan view and a side view illustrating a stator core included in the stator, respectively.
Figure 3B:
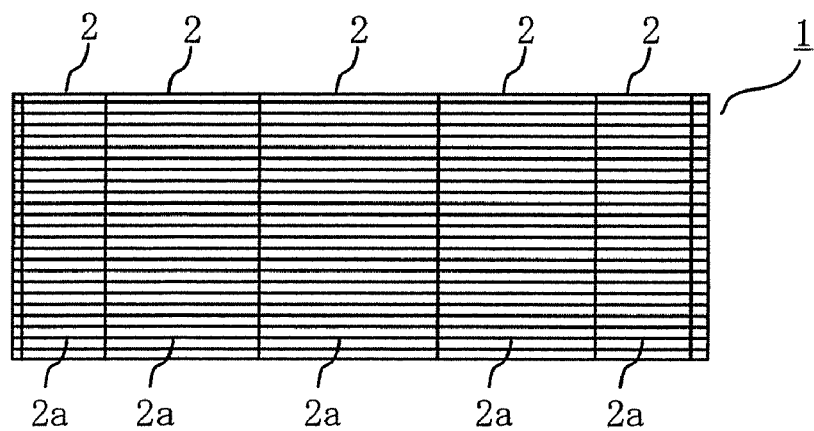

FIGS. 3A and 3B are a plan view and a side view illustrating the stator core included in the stator, respectively. As shown in FIGS. 3A and 3B, the split cores 2 are formed by stacking split core members 2a. In the split core member 2a, the shape of a first end, which is one end of the york portion in a circumferential direction, is different from the shape of a second end which is the other end of the york portion. A york portion 2b in which one end has a convex shape and the other end has a concave shape is given as an example of the york portion. The split core member 2a includes a magnetic pole tooth portion 2c protruding from the york portion 2b inward in the radial direction. Two concavo-convex portions 2d which are formed for caulking and of which locations are different from each other in the radial direction are formed on the center front surface of the split core member 2a. In the concavo-convex portions 2d, a concave portion is formed on the front surface of the split core member 2a and a convex portion is formed at a location corresponding to the concave portion on the rear surface of the split core member 2a. The split core 2 is formed by stacking the split core members 2a and fixing the interlayer one another by the caulking concavo-convex portions 2d.

The stator core is formed by arranging the twelve split cores 2 in the annular shape and bringing the twelve split cores into contact with each other. In the split cores 2, the first ends which are one ends of the york portion 2b in the circumferential direction come in contact with the second ends, which have the shape different from that of the first ends of the york portions 2b, of the split cores adjacent to the first ends. For example, a convex shape and a concave shape of the york portion 2b come in contact with each other. In this case, it is possible to obtain an advantage of restriction on location so that the split cores 2 adjacent to each other do not deviate from each other in the radial direction, since the convex portions and the concave portions come in contact with each other. That is, when the first and the second ends have a shape fitted with each other, it is possible to obtain an advantage of restriction on location so that the split cores 2 adjacent to each other do not deviate from each other in the radial direction, since the ends of the york portions of the split cores 2 adjacent to each other in the circumferential direction come in contact with each other. Hereinafter, the example in which the first and the second ends have the convex shape and the concave shape, respectively, will be described.

Figure 4:
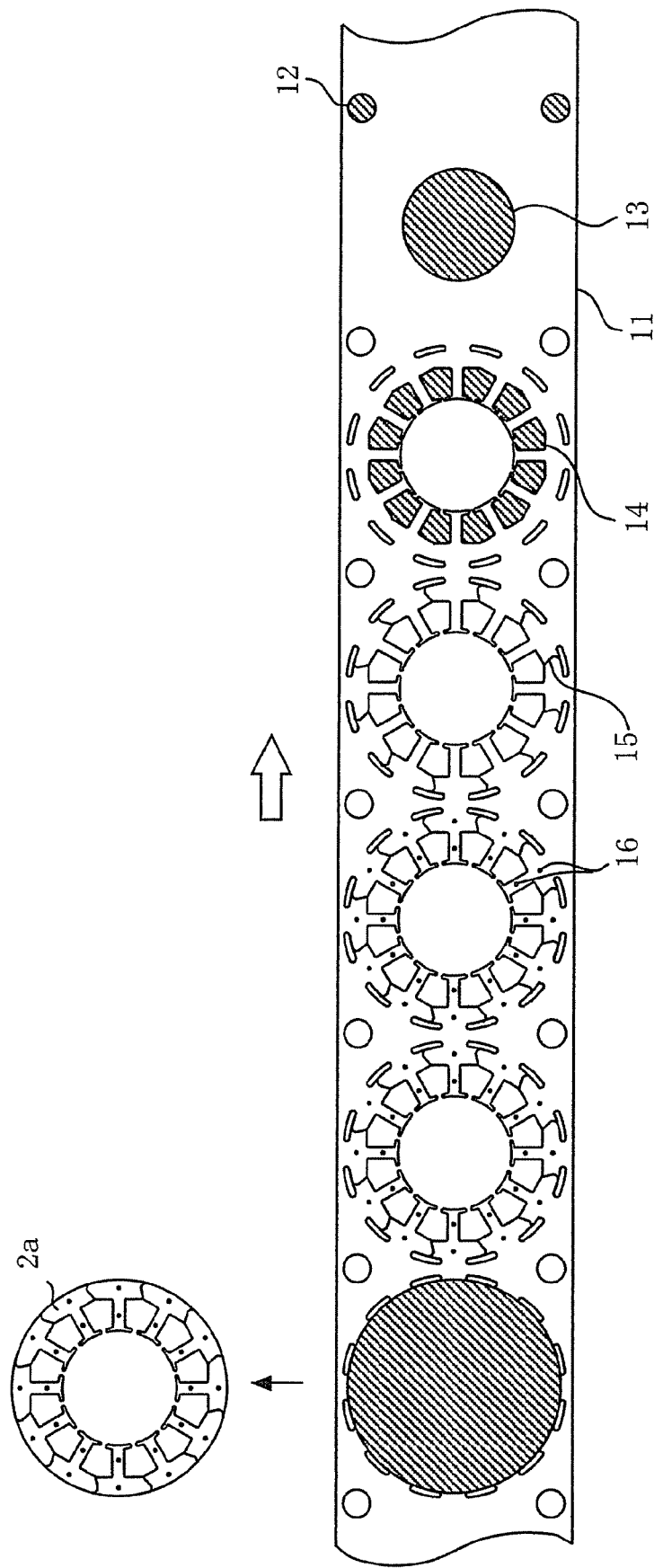
FIG. 4 is a plan view illustrating a material shapes during a punching for the split core members using a press mold.

FIG. 4 is a diagram illustrating a process of forming the split core member 2*a* by a punching operation using a press mold with a steel plate. FIG. 4 is a plan view illustrating the material shape after each punching. An arrow shown in the figure indicates a sequence of processes. That is, the shapes after punching in an initial process and in a final process are shown in the right end and the left end of the figure, respectively. A drawing indicated by an upward arrow in the left end shows the split core members completed by the punching in a process in the left end. The more details will be described with reference to FIG. 4. The description is started with a drawing in the right end of FIG. 4. Circular pilot holes 12 are punched in both sides of a thin steel sheet 11 (hereinafter, abbreviated as a steel sheet 11) such as an electromagnetic steel sheet or a SPCE made of a magnetic material and used as location references in a press process. Portions subjected to the punching in this process are illustrated by a hatch for easy view. The steel sheet 11 having a thickness of 0.2 mm to 0.5 mm is sent by a predetermined distance between the pilot holes 12 in a direction of a white arrow and a deformation process is repeatedly and sequentially performed on the portion subjected to the process in the right end of FIG. 4 using a press mold. However, for easy view of the process state, the shape after the punching in the subsequent step is shown in the left side in FIG. 4. First, the inner circumference 13 of the stator is punched by a circular punch (the right drawing in FIG. 4). Subsequently, slot shapes 14 which are spaces for the tooth portions of the stator cores adjacent to each other are punched (a second drawing from the right end of FIG. 4). Subsequently, the ends of the york portions of the adjacent split core members are cut by performing a cutting process 15 (a third drawing from the right end of FIG. 4). Cut portions subjected to the cutting process 15 are processed with a diagonal shape punch, for example. Since portions cut by lowering the punch are returned to the original locations after lift of the punch, a gap is not formed in the cut portions. Subsequently, concavo-convex portions 16 for caulking are processed (a fourth drawing from the right end of FIG. 4). A new reference numeral is given to the concavo-convex portions 16 for convenient description, even though the concavo-convex portions 16 are the same as the concavo-convex portions 2*d* in FIG. 3. The caulking concavo-convex portions 16 are used when the split core members 2*a* are stacked and fixed. A fifth drawing from the right end of the FIG. 4 is subjected to the punching at the same locations as those of the caulking concavo-convex portions 16. Upon performing the punching, a process on the caulking concavo-convex portions 16 is not performed. That is, the processes on the fourth drawing and the fifth drawing from the right end of FIG. 4 are selectively performed. The punching is performed on only the split core members 2*a* located in the lowest location upon stacking the split core members.

Subsequently, the outer shape of the stator is punched (a sixth drawing from the right end of FIG. 4) and stacked with the steel plates punched beforehand. Then, the concavo-convex portions 16 are caulked by a press process with a pressing machine. A laminate is formed by punching a predetermined number of sheets and stacking the punched sheets. In this way, the twelve split cores 2 arranged without a gap between the split core members 2*a* are obtained from the pressing machine (the drawing indicated by the arrow in the left end of FIG. 4).

Figure 5:
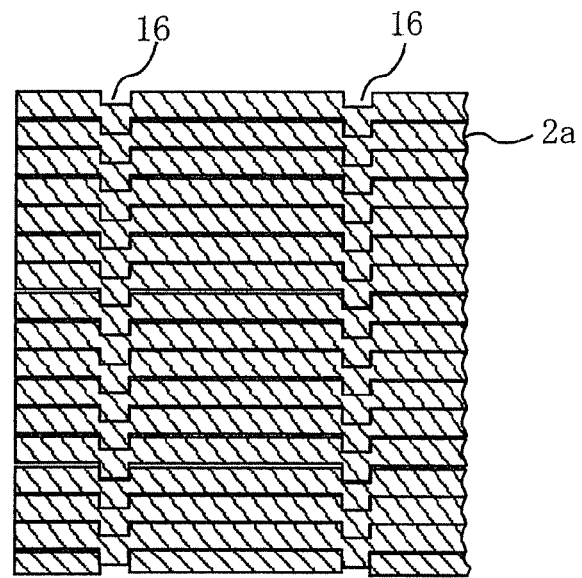
FIG. 5 is a sectional view illustrating caulking concavo-convex portions.

FIG. 5 is a sectional view illustrating lines passing though the locations of two caulking concavo-convex portions 16 of the split core 2 obtained by stacking the split core members 2*a*. The split core members in the lowest layer are shown in the fifth drawing from the right end of FIG. 4 and obtained during the process of punching holes at the same locations as those of the caulking concavo-convex portions 16. The split core members in the other layers are shown in the fourth drawing from the right end of FIG. 4 and obtained by the process of forming the caulking concavo-convex portions 16.

In this way, the shapes formed by the annular split core members 2*a* are equal to each other in the stack direction. Therefore, when a shape error occurs in one portion of the inner circumferential shape of the annular split core members 2*a*, for example, a stepped portion caused by the shape error is formed in one portion of the inner circumferential shape of the stator core in a vertical direction. More specifically, when distances from the center of the rotational axis in the ends of the adjacent magnetic pole tooth portions are different, a difference between the distances is common in the stack direction. Therefore, the stepped portion is formed between the ends of the adjacent magnetic pole tooth portions.

Figure 6:
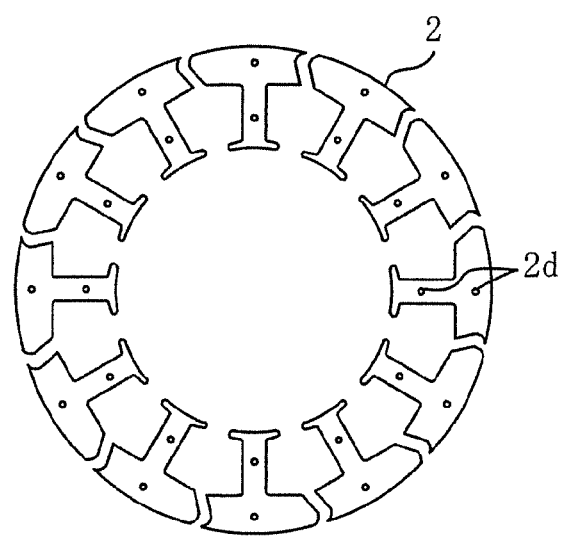
FIG. 6 is a plan view illustrating twelve split cores divided after taking the split core members subjected to pressing from the pressing machine.
Figure 7:
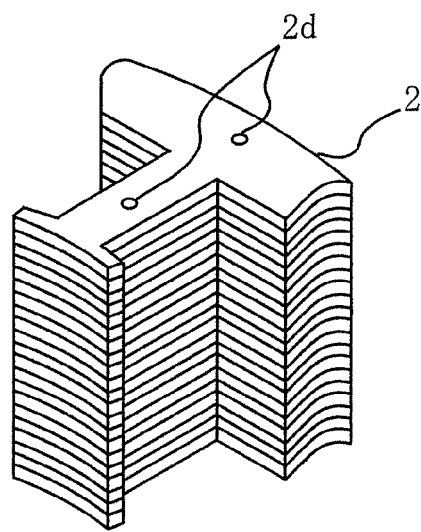
FIG. 7 is a perspective view illustrating one split core.
Figure 8:
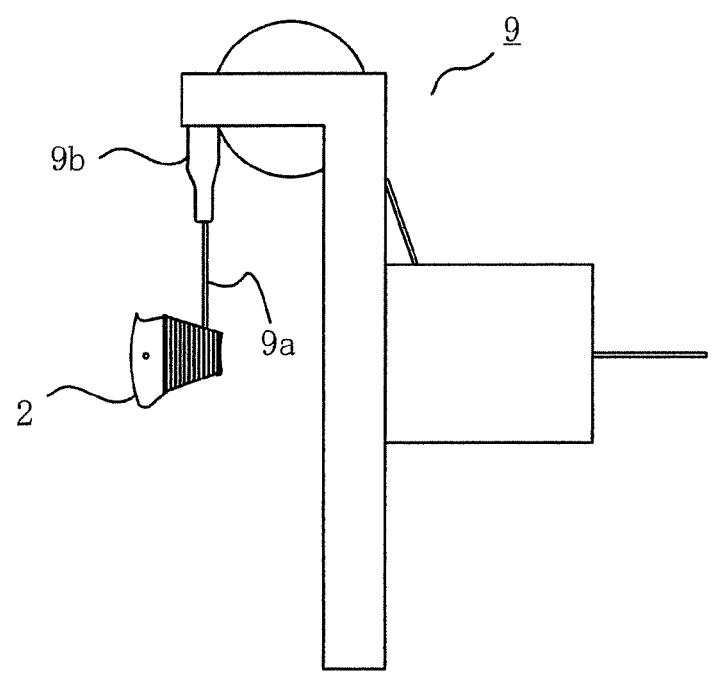
FIG. 8 is a schematic diagram illustrating a winding process around the divided split core.

FIG. 6 is a plan view illustrating twelve split cores 2 divided after taking the split core members subjected to pressing from the pressing machine. In this figure, spaces between the york portions 2*b* of the adjacent split core members 2*a* are shown. The spaces are illustrated for easy view of the individual split core members 2*a*, but are not actually present. FIG. 7 is a perspective view illustrating one split core 2 and the plurality of stacked split core members 2*a* shown in FIG. 6. FIG. 8 is a schematic diagram illustrating a winding process on the divided split core 2. In FIG. 8, Reference Numeral 9 denotes a winding machine, Reference Numeral 9*a* denotes a copper wiring (of which the surface is insulation-coated), and Reference Numeral 9*b* denotes a flyer nozzle. One split core 2 shown in FIG. 7 is mounted in the wiring machine 9 to wind the copper wiring 9*a* around the split core 2 by rotation of the flyer nozzle 9*b*. Alternatively, the winding process may be performed by rotating the split core 2.

In the wiring process, the split core 2 is separated and a space for supplying the copper wiring 9*a* is sufficiently ensured, the copper wiring 9*a* can be supplied from the wiring machine 9 in the sufficient space in a state where a straight property is maintained. Accordingly, since it is possible to perform the wiring in a state where the copper wiring 9*a* is wound in alignment for the magnetic pole tooth portion, a coil occupation ratio can be increased. Moreover, since the sufficient space for the wiring is ensured, the wiring can be performed in a circular orbit in which a high speed motion is possible, thereby achieving high productivity.

The wound split cores 2 each come in contact with the adjacent split cores 2 so that the ends of the york portions, which correspond to the cut portions in the punching, having the different shapes one another in the circumferential direction are adjacent to each other. Then, the split cores 2 are arranged in the annular shape as shown in FIG. 6 (in this case, there is no space between the york portions adjacent to each other) to constitute the stator core.

Figure 9:
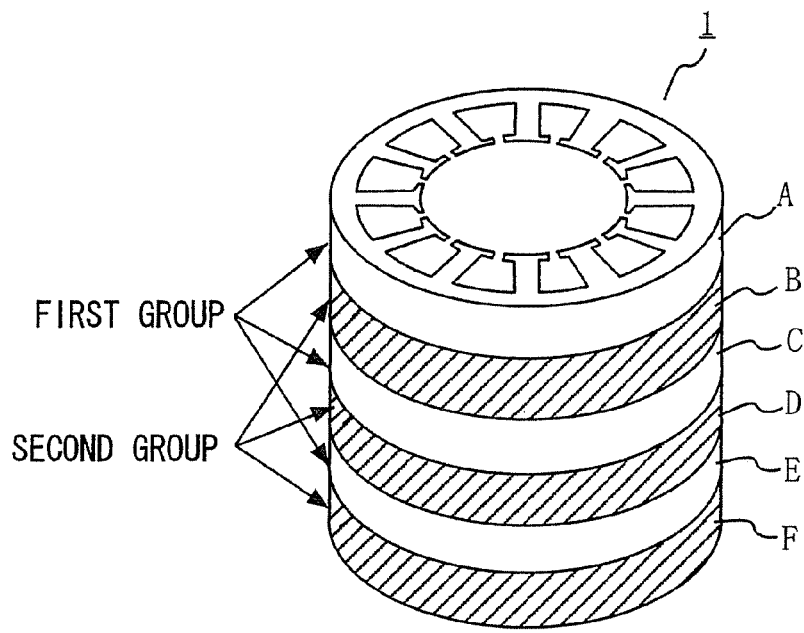
FIG. 9 is a schematic perspective view illustrating the stator core including the split cores of the rotating electric machine according to the invention.

FIG. 9 is perspective view illustrating an example of the stator core including the split cores 2 of the rotating electric machine according to the invention. Each of laminate portions of A, B, C, D, E, and F shown in FIG. 9 is a part of the stator core including the split cores 2 formed by the stack in the processes described above in FIGS. 4 to 8. In addition, the stack thickness of the laminate portions is thinner than a completed stator core. Hereinafter, the respective laminate portions are referred to as laminates A, B, C, D, E, and F for convenient description. Rolling directions of respective layers included in the laminates are equal to each other, since the split core members 2a punched from each one steel sheet are stacked in a state where the punched location relation is just maintained without change. The laminates have a stepped portion of magnetic portions at an equal location, when a distance difference is present between a specific magnetic pole end and an adjacent magnetic pole end in view from a rotor rotational center due to a partial error in the punch mold upon assembling the laminates in an annular shape. When an arrangement relation between a punch processing machine and the steel sheet as a processing target is common, the arrangement of the stepped portion and the rolling direction are common for the respective laminates. Therefore, as long as the laminates are prepared by the same machine and from the same steel sheet, the laminates are equally formed by setting a predetermine direction X and using the direction X as the same direction.

In this example, the laminates are classified into two groups. The laminates A, C, and E are classified as a first group and the laminates B, D, and F are classified as a second group. The relation between the punch mold used to prepare the laminates and the rolling direction of the steel sheet is common for the laminates. Therefore, the respective laminates are equal to each other, except for the thicknesses of the respective laminates. The direction X is divided into a direction X1 and a direction X2 for the laminates of the first group and the laminates of the second group, respectively, which have a predetermined angle. A stacking method in which laminates are classified into a plurality of groups and the directions X of the respective groups do not accord with each other and have a predetermined angle is called a rotational stack. By preparing the stator core by the rotational stack, it is possible to reduce a torque pulsation component of the rotating electric machine which is caused by the shape asymmetry of the stator core, which will be described below. In addition, the number of groups constituting the laminates may be one.

Occurrence of the torque pulsation of the rotating electric machine will be described. The torque pulsation occurs due to various causes. In general, the torque pulsation is mainly caused by a stator and secondarily caused by a rotor. For example, an error in the inner circumferential shape of the stator, irregular distribution of stress caused by welding, shape asymmetry, and magnetic asymmetry of the stator caused by magnetic anisotropy or the like are dominant causes for the occurrence of the torque pulsation. When these causes are present, unbalance occurs in a magnetic property in a circumferential direction, that is, permeance which is the reciprocal of magnetoresistance. Therefore, magnetic energy generated from an air gap between the respective magnetic poles of the stator and the rotor varies in accordance with location of the circumferential direction, namely, the rotor rotational angle. For that reason, the torque pulsation occurs in either electricity application or non-electricity application, when the rotor is rotated. The torque pulsation occurring in non-electricity application is called cogging torque. The torque pulsation occurring in electricity application is called torque ripple. Torque variation in the circumferential direction caused by the magnetic asymmetry of the stator is pulsed at the same period as the number p of magnet poles along with the rotation of the rotor.

A torque pulsation component, having a period, can be represented on the complex plane by a vector. Hereinafter, the torque pulsation component and a torque vector are used as the same meaning. On the assumption that torque generated when the rotor is located at a rotational angle $\theta$ from a predetermined reference of the stator is $T(\theta)$, an expression including a phase is:

$$T(\theta) = |T| \cdot \exp(j\theta) \tag{1},$$

where $|T|$ is an absolute value of the torque $T(\theta)$ and j is an imaginary unit. The expression is represented by a vector in a polar coordinate space and expressed as a torque vector T corresponding to torque $T(\theta)$ as follows:

$$T = (Tx, Ty), \tag{2}$$

$$|T| = (Tx^2 + Ty^2)^{1/2}, \tag{3}$$

$$T_x = \frac{k\mu_0 F^2}{2} \int_0^{2\pi/p} A_0(\phi, \theta)\cos(p\phi)d\phi, \tag{4}$$

$$T_y = \frac{k\mu_0 F^2}{2} \int_0^{2\pi/p} A_0(\phi, \theta)\sin(p\phi)d\phi, \tag{5}$$

and $$A_0(\phi, \theta) = \sum_{n=1}^{p} \frac{\partial}{\partial \theta}\{1/g_n(\phi, \theta)\}^2, \tag{6}$$

where $g(\phi, \theta)$ is a length of an air gap at a location of an angle $\phi$ on the assumption that a rotational angle $\theta$ is a reference angle, F is a magnetomotive force and is generally proportional to the stack thickness of the stator core, $\mu_0$ is a magnetic permeability of vacuum, k is a value obtained by dividing a volume of the air gap at a minute angle $d\phi$ by $d\phi$ and is proportional to the stack thickness of the stator core, and p is the number of magnetic poles of the rotor.

The phase angle of the toque vector T can be obtained from Tx and Ty. Torque interacts with a magnet force. Therefore, since the magnet force has a period of the number of magnets with respect to one circle (one circle as a machine angle) of the rotor, the torque also has a period by the number of magnets (which is a period of a magnetic pole angle). An angle corresponding to the period is called a magnetic pole angle and equal to a product of the number of magnetic poles of the rotor and the machine angle. Accordingly, by preparing the plurality of laminates having the torque vector vibrated at a period of the magnetic pole angle and performing a so-called rotational stack in which the laminates are stacked by mutually rotating the laminates at a predetermined angle, it is possible to decrease the vector sum represented by the magnetic pole angle and reduce the torque pulsation caused by the shape, magnetic characteristics such as magnetic anisotropy of a steel sheet, magnetic asymmetry caused by stress distribution in the stator core in the whole of the stator core substantially.

An offset condition of the torque vector by the rotational stack is expressed as the below expression. The magnetic pole angle is expressed as a product of the number of magnetic poles of the rotor and the rotational angle (the machine angle described above).

$$\sum_{i=1}^{n} |Ti| \cdot \exp(j\alpha i \cdot p) = 0 \quad (7)$$

where i is a group number of a laminate, p is the number of magnetic poles of the rotor, |T| is the magnitude of a torque vector of a laminate belonging to an i group and can be obtained by Expressions (3) to (5) described above, and αi is a rotational angle of the laminate belonging to the i group.

When the split core members 2a forming each laminate are punched from the steel sheets having equal characteristics using the same punch mold, |Ti| is proportional to the total sum of the stack thickness of the laminates belonging to the i group. Accordingly, on the assumption that the total sum of the stack thickness of the laminates belonging to the i group is hi, Expression (7) is transformed into the below expression (8).

$$\sum_{i=1}^{n} hi \cdot \exp(j\alpha i \cdot p) = 0 \quad (8)$$

Figure 10:
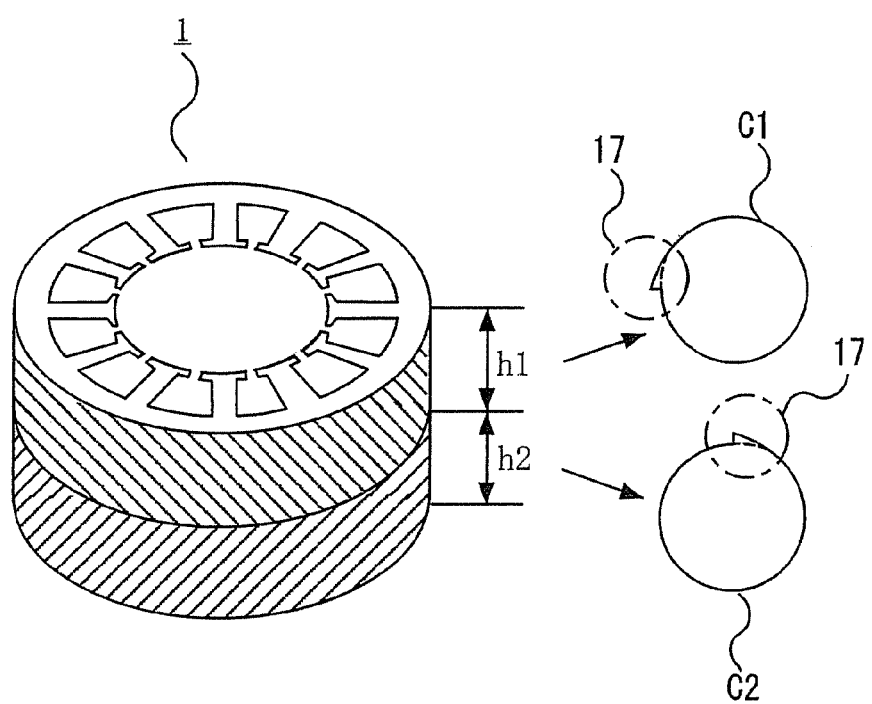
FIG. 10 is a schematic diagram illustrating a stator core formed by rotating and stacking two laminates in which a first group and a second group each consisting of one laminate and a stepped portion in one portion of the inner circumferential shape.

FIG. 10 shows an example in which the laminates consist of two groups and sums of the thicknesses of the laminates belonging to the respective groups are h1 and h2. In this example, as shown in the right figure of FIG. 10, a stepped portion 17 as a cause of the magnetic asymmetry of the stator is present between end portions of front ends of the adjacent magnetic pole tooth portions. In FIG. 10, portions deviated from circles C1 and C2 inscribed to the front ends of the magnetic pole tooth portion are shown as the stepped portions 17.

When the sum of the stack thicknesses of the laminates belonging to the i group are equal to each other, Expression (8) is transformed into the below expression (9).

$$\sum_{i=1}^{n} \exp(j\alpha i \cdot p) = 0 \quad (9)$$

On the assumption that the number of laminates belonging to each group is one and an angle between a first layer and a second layer is α in a case of h1=h2 in FIG. 10 or on the assumption that the sums of the stack thicknesses of a first group and a second group are equal to each other and rotational angles of the first group and the second group with respect to a predetermined reference location are α1 and α2, expressions for a real part and an imaginary part are expressed using Expression (9) as follows:

$$\cos(\alpha 1 \cdot p) + \cos(\alpha 2 \cdot p) = 0 \quad (10)$$

and $$\sin(\alpha 1 \cdot p) + \sin(\alpha 2 \cdot p) = 0 \quad (11).$$

When a condition of $(\alpha 2 - \alpha 1) \cdot p = \pi + 2\pi \cdot k$ (where k is an integer number) is satisfied from the above expressions, the first group and the second group become an inverse phase.

FIGS. 11A, 11B, and 11C are diagrams illustrating a vector of the torque pulsation in the example in which torque pulsation components by the shape are inverse phases one another in the first group and the second group and have an equal magnitude. For example, when p is 10, α2−α1 is set to α. When π/2 is selected as α, an equation α·p=5π=π+2π×2. When k=2, it can be known that Expression (9) is satisfied. Accordingly, the vectors have the inverse phase in the first group and the second group. Moreover, when the stack thicknesses of the first group and the second group are made equal, the magnitudes of the vectors become equal. When set in this way, a resultant vector becomes zero. Therefore, when a common torque pulsation component caused by the shape of the respective laminates, the magnetic anisotropy of the steel sheet, or the like, it is possible to reduce the torque pulsation component caused by these causes by the rotational stack.

When the rotational angle αi is set in a normal design, a restriction that slot locations are matched with each other between the groups of the laminates is added. When the restriction is not added, the locations of magnetic poles are crossed in every laminate and thus a problem with the coil in the magnetic pole tooth portion may occur. For that reason, the rotational angle αi in the stator having s slots is restricted to a value taken from the below expression:

$$\alpha i = 2\pi \cdot t/s \text{ (where } t \text{ is an integer in } 0 \leq t \leq s-1) \quad (12).$$

When the rotational angle αi is transformed into a magnetic pole angle αi' in use of the rotor with p number of magnetic poles, the below expression is obtained:

$$\alpha i' = \alpha i \cdot p = 2\pi \cdot t \cdot p/s \text{ (where } t \text{ is an integer in } 0 \leq t \leq s-1) \quad (13).$$

For example, when the thickness of the laminates consisting of a plurality of groups are all equal and the rotating electric machine with eight poles and twelve slots and the rotating electric machine with ten poles and twelve slots are used, the magnetic pole angle αi' set for the i group is transformed into Expressions (14) and (15) from Expressions (12) and (13), respectively:

$$\alpha i' = (4\pi/3) \times t \text{ (where } t \text{ is an integer in } 0 \leq t \leq 11) \quad (14)$$

and $$\alpha i' = (5\pi/3) \times t \text{ (where } t \text{ is an integer in } 0 \leq t \leq 11) \quad (15).$$

FIG. 12A is a diagram illustrating the torque vector having a phase corresponding to the magnetic pole angle obtained from Expression (14) allowed in the case of eight poles and twelve slots. FIG. 12B is a diagram illustrating the torque vector having a phase corresponding to the magnetic pole angle obtained from Expression (15) allowed in the case of ten poles and twelve slots.

In an example of the two laminates in eight poles and twelve slots, the magnetic pole angles obtained from Expressions (10) and (11) are 0 and π. On the other hand, the magnetic pole angles allowed from Expression (14) are 0, 2π/3, 4π/3, and integer multiple thereof by 2π. Since π is not contained in the above magnetic pole angles, it is concluded that in the case of eight poles and twelve slots, the torque pulsation is not offset in the rotational stack of the two laminates.

Next, in an example of the two laminates in ten poles and twelve slots, the magnetic pole angles obtained from Expressions (10) and (11) are equally 0 and π. On the other hand, the magnetic pole angles allowed from Expression (15) are 0, π/3, 2π/3, π, 4π/3, 5π/3, and integer multiple thereof by 2π. Since 0 and π are contained in the above magnetic pole angles, it is concluded that in the case of ten poles and twelve slots, the torque pulsation can be offset in the rotational stack of the two laminates. Since a phase relation of the two laminates related to the offset is relative, the magnetic pole angles satisfying Expression (9) may be separate one another by π. Accordingly, π/3 and 4π/3, 2π/3 and 5π/3 may be combined as well as the combination of 0 and π. The rotational angle of the other laminate with respect to one laminate may be π/10.

An electric motor such as a power steering having a high practical use may have twelve stator slots and ten rotor poles or twelve stator slots and eight rotor poles, since the electric motor has a high torque characteristic and is suitable for miniaturization. Such an electric motor needs to reduce the torque pulsation.

First, when the stator core is formed with two laminates having an equal stack thickness in the electric motor having twelve stator slots and ten rotor poles, the rotational angle between the laminates is calculated as $\pi/2$ by the above-described method.

When the stator core is formed with three laminates having an equal stack thickness in the electric motor having twelve stator slots and eight rotor poles, the rotational angles of the other laminates with respect to one laminate are calculated as $\pi/6$ and $\pi/3$ by the above-described method.

With this method, the minimum rotational angle in the rotational stack is selected. In the rotational stack, the laminates formed by cutting and stacking by the mold, as described above, are continuously cut and stacked by rotating the laminates by the rotational angles. Accordingly, an advantage of improving productivity is obtained, since the minimum rotational angle means that time necessary for rotation is made shorter. In these examples, the two laminates and the three laminates have been described, but the laminates may be stacked as a plurality of groups shown in FIG. 9 by repeatedly stacking the two or three laminates having the angle relation selected above. When the number of laminates forming the groups increases, the time necessary for the rotation also increases. Therefore, an advantage of shortening the time like the above examples is obtained. That is, the productivity is further improved.

When the slot locations of the laminates are not matched, the restriction of Expressions (12) and (13) are not necessary. As an example of such a case, a coil is wound on every laminate, the respective laminates are rotated in accordance with the rotational stack, and the laminates are integrally formed. In this case, the same advantages described above can be obtained.

Figure 13:
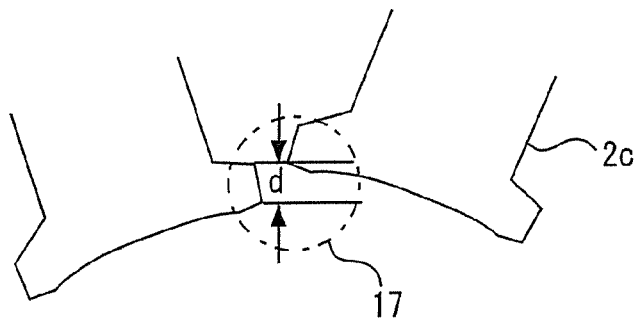
FIG. 13 is a diagram illustrating a stepped portion between adjacent ends of front ends of magnetic pole tooth portions.
Figure 14:
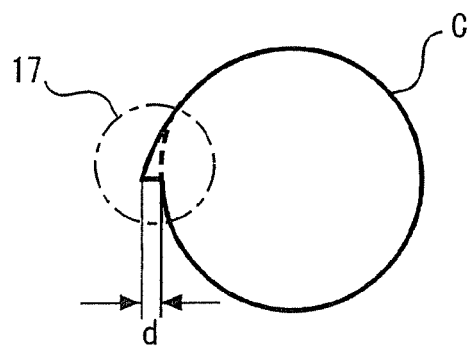
FIG. 14 is a diagram illustrating a case where the stepped portion between the adjacent ends of the front ends of the magnetic pole tooth portions exists at a predetermined location of an inner circumference of the stator.
Figure 15:
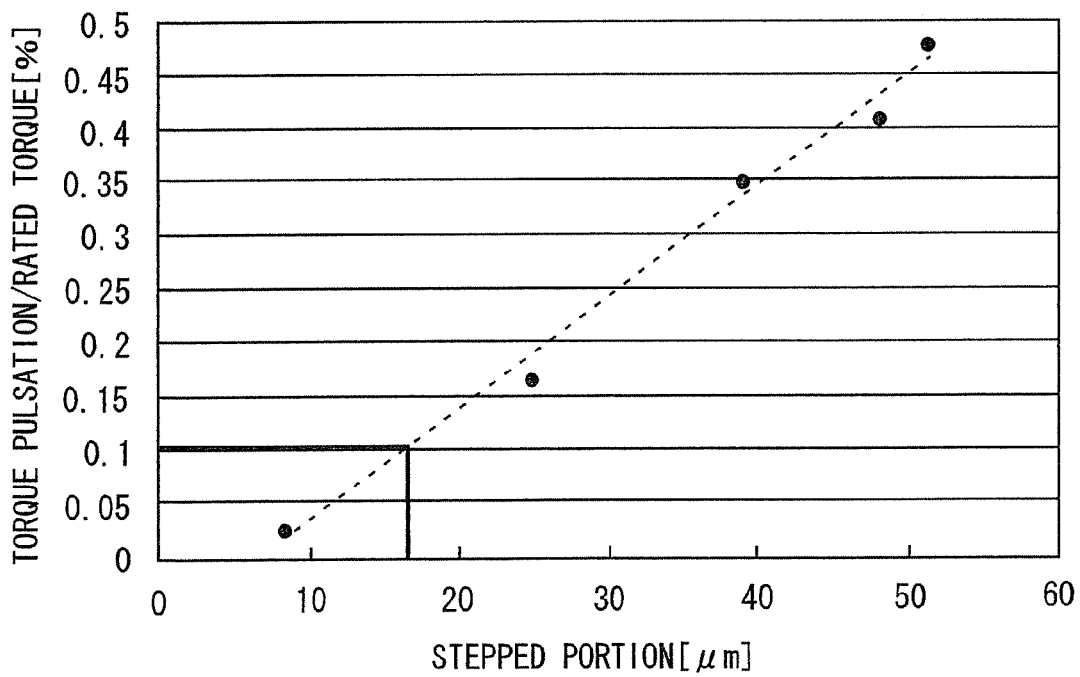
FIG. 15 is a diagram illustrating a relation between the stepped portion and the torque pulsation.

In recent years, a demand for reducing the torque pulsation was increased in order to improve positioning accuracy or reduce vibration or noise. Quantitatively, reducing the torque pulsation by 0.1% of a rated torque was demanded from the market. In the split cores, as shown in FIG. 13, the stepped portion easily occurs in the adjacent front ends of the magnetic pole tooth portions. Therefore, the stepped portion may cause deterioration in the torque pulsation. For example, when the stepped portion occurs in one portion of an inscribed circle C in the front end of the magnetic pole tooth portion, as shown in FIG. 14, measurement results of a relation between the size of the stepped portion and the magnitude of the torque pulsation are shown in FIG. 15. A neodymium magnet was used in the rotor and a small standard motor in which an air gap between a stator and a rotor is a 0.6 mm, an outer diameter of the stator is 80 mm, and a stack height is 40 mm was used. The torque pulsation is proportional to the size of the stepped portion. In order to reduce the torque pulsation by 0.1%, the stepped portion has to be suppressed to 17 μm or less. In an integrated core which is not divided, the stepped portion is determined by mold accuracy. Since the mold accuracy is 10 μm or less, a problem that the torque pulsation is deteriorated to 0.1% or more does not occur. In the split cores, the stepped portion easily occurs since assembly accuracy is about 30 μm. Therefore, it is difficult to suppress the torque pulsation to 0.1% or less. The invention is a technique capable of allowing the stepped portion, which rarely occurs in the integrated core, in the core having an error of the inner circumference shape by 10 μm or more and capable of reducing the torque pulsation.

It is ideal that the magnitude of the resultant torque vector by the rotational stack is zero, but in many cases, it is difficult to make the resultant torque zero due to various situations. Even in these cases, some advantage may be obtained in practical use, when the result torque vector is made smaller than the maximum magnitude of the torque vector of the respective laminates. The reference is as follows.

Rotational angles $\alpha i$ are set as described below on the assumption that the number of poles of the rotor is p, the magnitude of the torque vector of the i-th laminate is $|Ti|$, and the maximum value of Ti is MAX(Ti) (where i=1 to n).

$$\sum_{i=1}^{n} |Ti| \cdot \exp(j\alpha i \cdot p)$$

That is, n number of predetermined rotational angles $\alpha i$ are set so that the magnitude of the resultant torque vector defined by the above expression may be smaller than MAX(Ti). The torque vectors of Ti corresponding to hi can be all calculated by Expressions (2), (4), and (5). Accordingly, hi and $\alpha i$ satisfying the above reference can be obtained.

When the causes of the torque pulsation of the respective laminates are common, it is considered that the torque pulsation component caused by the shape asymmetry of the respective laminates is proportional to the thickness of the laminates. Therefore, $|Ti|$ may be replaced by hi and hi and $\alpha i$ satisfying the above reference can be obtained more simply.

Second Embodiment

Figure 16A:
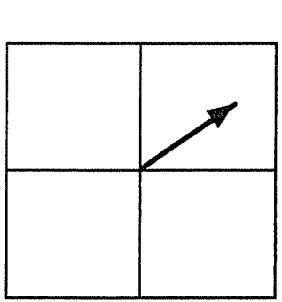
FIGS. 16A, 16B, and 16C are diagrams illustrating an example in which the torque pulsation components are offset by stress.
Figure 16B:
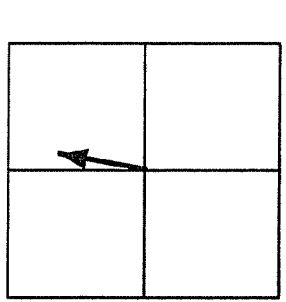

A second embodiment describes that the torque pulsation component caused by the asymmetric property of shape and the torque pulsation components caused by the stress are offset one another, as shown in FIG. 16. FIGS. 16A and 16B show that the magnitudes and phases of the torque vectors can be set by grasping the torque pulsation components as vectors and varying the stack thicknesses of the first group and the second group and the rotational angles of the laminates forming the respective groups in an arbitrarily set reference direction.

Accordingly, the resultant torque vector obtained by combining the first group and the second group and associated with the rotational stack can also be set in an arbitrary manner.

On the other hand, in the stator core formed by stacking the laminates of the first and second groups collectively and integrally, the outer circumference is contracted and inserted in a frame to be fixed. In this case, tightening stress is added to the respective laminates due to the frame. However, the tightening stress is uniform in the stack direction, but is distributed asymmetrically in a circumferential direction of the stator core in many cases. Therefore, the torque pulsation component (that is, the torque vector) occurs due to the asymmetry. The asymmetry in the tightening stress of the frame is common for the laminates even though the respective laminates are rotated in any direction and stacked. Therefore, the phase of the torque vector caused by the asymmetry of the tightening does not depend on the rotation in stack of the laminates. That is, the magnitude and phase of the torque vector by stress of the stator core tightened by the frame and fixed in an annular shape are fixed. On the other hand, in the stator core formed by the laminates of the two groups shown in this example, as described above, the resultant torque vector associated with the rotational stack can be arbitrarily set.

Figure 16C:
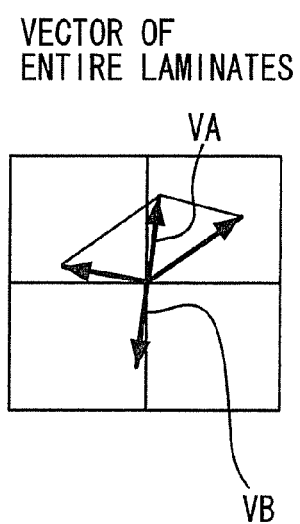

In this way, as shown in FIG. 16C, it is possible to offset both the torque vectors VA and VB, that is, the torque pulsation components by setting the sum of the thicknesses of the laminates belonging to the respective groups and the mutual rotational angle of both the groups so that the magnitude of the resultant torque vector VA obtained in combination of the torque vectors of the two groups of the laminates by the shape asymmetry is made equal to the magnitude of the torque vector VB by the stress and the phase of the resultant torque vector VA and the phase of the torque vector VB by the stress are inverse one another.

The sums of the thicknesses of the laminates belonging to the respective groups is different from each other in FIGS. 16A, 16B, and 16C, but may be equal to each other. When the stack thicknesses of the plurality of laminates are substantially equal to each other, the magnitudes of the torque pulsation components by the shape asymmetry in every laminates become equal to each other. Accordingly, an advantage of simply offsetting the torque pulsation components only in consideration of the rotational angle can be obtained.

The torque vector by the stress can be obtained by experimentally using a model object processed without the shape asymmetry.

It is ideal that the magnitude of the resultant torque vector, to which the magnitude of the resultant torque vector by the shape and the magnitude of the resultant torque vector by the stress are combined, are zero. But in many cases, it is difficult to make the resultant torque vector zero in various situations. Even in these cases, some advantage may be obtained in practical use, when the result torque vector having the maximum magnitude by the shape asymmetry in the respective laminates is made smaller than one having larger value between the torque vector of the laminates having the maximum stack thickness and the torque vector caused by the asymmetric property of stress.

Rotational angles $\alpha i$ (where i=1 to n) are determined as described below on the assumption that the number of poles of the rotor is p, the thickness of the i-th laminate is hi, the magnitude of the torque vector of the i-th laminate is |Ti|, and the maximum value of |Ti| is MAX(Ti) (where i=1 to n).

$$\sum_{i=1}^{n} |Ti| \cdot \exp(j\alpha i \cdot p) \tag{16}$$

That is, rotational angles $\alpha i$ are determined so that the magnitude of the resultant torque vector defined by the above expression may be smaller than one having a larger value between MAX(Ti) and the magnitude of the torque vector caused by the asymmetric property of stress.

Here, as the torque pulsation components, the torque pulsation components by the inner circumferential shape and the stress have been described, but the torque pulsation components caused by the asymmetric property of the stator core may be combined likewise to be reduced. For example, a component by the asymmetric property of a shape or a component by magnetic anisotropy in the rolling direction of the steel sheet is exemplified in addition to the components by the inner circumference shape or the stress.

In this embodiment, the laminates are classified into two types of the first group and the second group, but the vector combination is possible by three or more types of groups. In this case, the thicknesses of the respective groups and the magnitude and phase of the resultant vector by the rotational angle between the groups can be arbitrarily set likewise with the case of the two groups. In addition, the respective groups are formed by the plurality of laminates, but a group formed by one laminate may be used together. Even in this case, the advantages described above can be obtained. This embodiment is also applied to the first embodiment.

Third Embodiment

Figure 17:
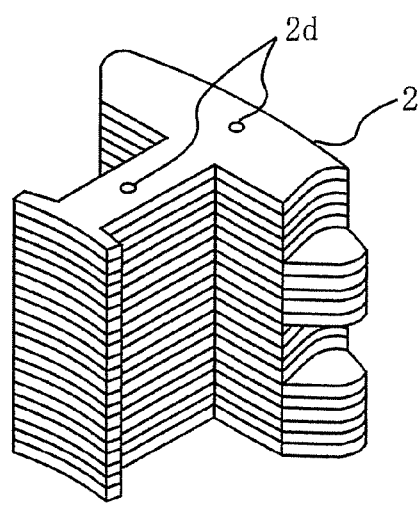
FIG. 17 is a perspective view illustrating one split core according to a third embodiment.
Figure 18A:
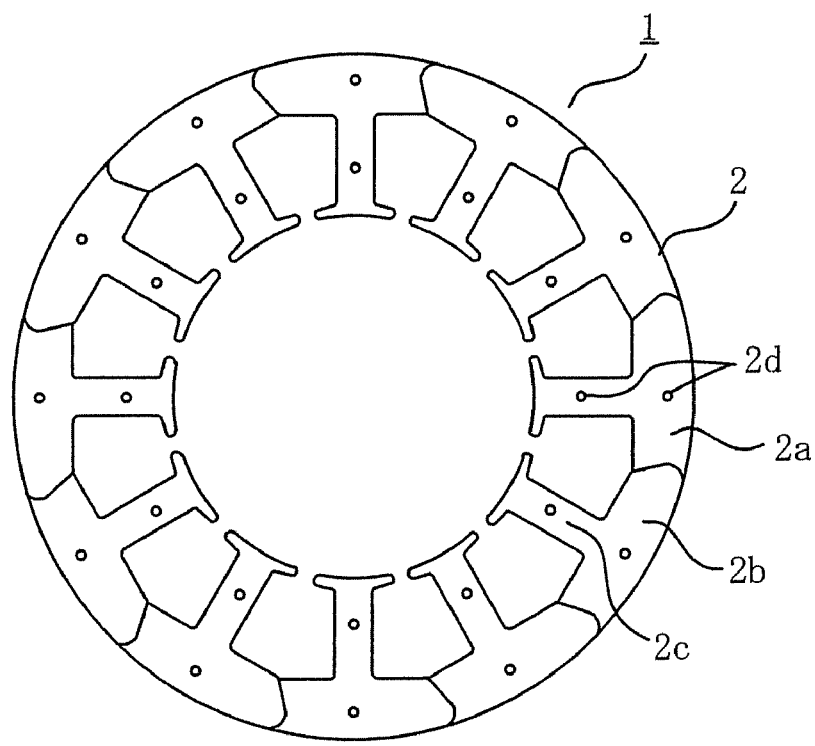
FIGS. 18A and 18B are a plan view and a side view illustrating a stator core according to the third embodiment of the invention, respectively.
Figure 18B:
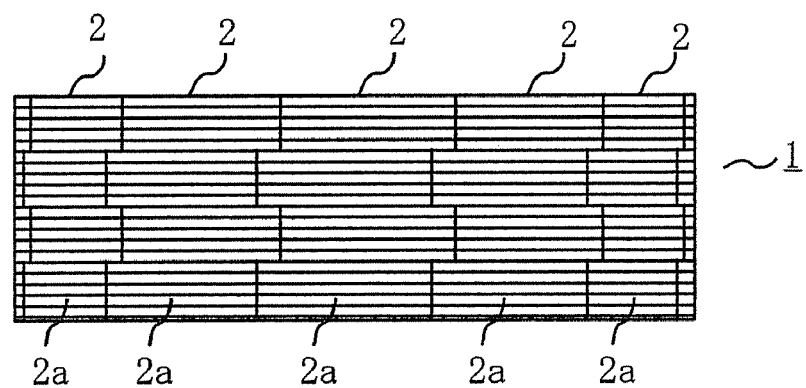

In a third embodiment, the split core 2 is formed by alternately stacking the split core member in which locations of a first end face and a second end face of the york portion 2b are reverse and the split core member in which the location of the first end surface and the second end surface by a predetermined thickness. FIG. 17 is a perspective view illustrating one split core formed in the above matter. In the shown example, the shapes of the first end face and the second end face are concave and convex, respectively. In the stator core, since the split cores 2 shown in FIG. 17 are stacked while maintaining the arrangement of the split core members 2a in the punching. Accordingly, when one end face is the first end face in the adjacent york end faces, the other face is the second end face. FIG. 18A and FIG. 18B are a plan view and a side view illustrating the stator core 1 formed in this manner. As known from FIG. 18B, two types of face shapes are fitted to each other in the respective york ends of the adjacent split cores 2. Therefore, the adjacent split cores 2 are fixed in the stack direction, thereby preventing deviation in the same direction.

In a method of manufacturing the split core members 2a by press according to the third embodiment, a process of forming the cut portions having the convex shape in a reverse direction is introduced in the process of forming the cut portions shown in FIG. 4. For example, the split cores 2 having the shape shown in FIG. 15 can be obtained by performing a pressing process, where the process of forming the cut portions having the convex shape in a right direction of the circumferential direction is added, on a predetermined number of sheets, and then switching a pressing process, where the process of forming the cut portions having the convex shape in a left direction of the circumferential direction is added, on a predetermined number of sheets several times.

The rotating electric machine capable of reducing the torque pulsation likewise with the first and second embodiments can be realized by rotating the split cores so as to change the rolling direction or a step direction, for example, and stacking the split cores likewise with the first and second embodiments.

According to the third embodiment, it is possible to surely bring the split core members 2a punched from the equal steel sheet into contact with each other in the adjacent split cores 2, since the location of the stack direction is restricted. In this way, flatness of respective layers is improved, thereby improving the shape accuracy on the whole. Accordingly, it is possible to obtain the advantage of further reducing the torque pulsation component by the rotational stack described above.

In this embodiment, an example of the shapes of the contact surfaces has been described. The shapes of the contact surface are not limited to the convex shape and the concave shape, but may include other shapes. Accordingly, various shapes of the contact surface may be used. Moreover, when the shapes of the contact surface can fitted to each other, a positioning advantage is further improved, thereby further reducing the torque pulsation by the rotational stack described above.

According to the invention, the rotating electric machine is effectively used as a driving motor used in a machine tool, an electrically-driven power steering of a passenger car, an elevator, etc.

Various modifications and alternations of this invention will be apparent to those skilled in the art without departing form the scope and spirit of this invention, and it should be understood that this is not limited to the illustrative embodiments set forth herein.

What is claimed is:

1. A method of manufacturing a rotating electric machine, the method comprising:
forming a rotor by fixing a rotor core having p number of magnetic poles around a shaft which is a rotational axis,
forming m number of split cores by stacking a plurality of split core members each of which includes a yoke portion and one magnetic pole tooth portion protruding from the yoke portion inward in a radial direction, and
forming a stator by winding a coil around the respective split cores to be arranged in an annular shape around an outer circumference of the rotor,
wherein the m number of split cores are formed by:
punching m number of split core members from steel sheets so that a plurality of split core members punched from one sheet are arranged relative to each other to form an annular pattern as they are punched from the one sheet,
stacking the punched split core members by a predetermined thickness while maintaining the annular pattern to form n number of (where n≧2) annularly arranged laminates,
matching an i-th annularly arranged laminate among the n number of annularly arranged laminates with a first annularly arranged laminate at a location of the magnetic pole tooth portions, and
stacking the i-th annularly arranged laminate by rotating the i-th annularly arranged laminate by a predetermined angle $\alpha i$ (where $0<\alpha i<2\pi$ and i=2 to n) with respect to the first annularly arranged laminate, and
wherein the stator is formed by:
arranging the m number of split cores formed in this manner in the annular pattern in a stack of the annularly arranged laminates.

2. The method according to claim 1, further comprising punching the split core members forming the n number of annularly arranged laminates under a common punching condition so that the n number of annularly arranged laminates have a common shape asymmetry.

3. The method according to claim 1, wherein when a magnitude Ti of a torque pulsation component of the i-th annularly arranged laminate is known, the method includes setting the angle $\alpha i$ (where i=1 to n and $\alpha 1=0$) to satisfy the below expression:

$$\sum_{i=1}^{n} Ti \cdot \exp(j\alpha i \cdot p).$$

4. The method according to claim 3, further comprising forming the split core members forming the n number of annularly arranged laminates by punching the steel sheets having a common magnetic anisotropy, and the magnitude Ti is proportional to a stack thickness of the i-th annularly arranged laminate.

5. The method according to claim 3, further comprising setting the angle $\alpha i$ (where i=1 to n and $\alpha 1=0$) to satisfy $\alpha i=2\pi \cdot t/s$ (where t is an integer in $0 \leq t \leq s-1$).

6. The method according to claim 1, when a magnitude Ti of a torque pulsation component of the i-th annularly arranged laminate is known and the maximum value of the magnitude Ti is a MAX(Ti), the method includes setting the angle $\alpha i$ (where i=1 to n and $\alpha 1=0$) so that a magnitude of a resultant torque pulsation component defined by the below expression is smaller than the MAX(Ti):

$$\sum_{i=1}^{n} Ti \cdot \exp(j\alpha i \cdot p).$$

7. The method according to claim 6, further comprising forming the split core members forming the n number of annularly arranged laminates by punching the steel sheets having a common magnetic anisotropy, and the magnitude Ti is proportional to a stack thickness of the i-th annularly arranged laminate.

8. The method according to claim 6, further comprising setting the angle $\alpha i$ (where i=1 to n and $\alpha 1=0$) to satisfy $\alpha i=2\pi \cdot t/s$ (where t is an integer in $0 \leq t \leq s-1$).

9. The method according to claim 1, wherein when a stack thickness of the i-th annularly arranged laminate is hi, a magnitude Ti (where i=1 to n) of a torque pulsation component corresponding to hi caused by the shape asymmetry of the annularly arranged laminates is known, and a torque pulsation caused by an asymmetric property of stress applied commonly to the annularly arranged laminates forming the stator core is known, a magnitude of the resultant torque pulsation defined by the below expression and caused by the shape asymmetry is the same as a magnitude of the torque pulsation caused by the asymmetric property of the stress, and the respective stack thicknesses hi of the n number of annularly arranged laminates forming the stator core and respective angles $\alpha i$ (where i=1 to n and $\alpha i=0$) in stack are set so that the phases of torque pulsation components are inverse one another in a magnetic pole angle:

$$\sum_{i=1}^{n} Ti \cdot \exp(j\alpha i \cdot p).$$

10. The method according to claim 1, wherein both ends of the yoke portion in a circumferential direction included in the split core member have a complementary relation and include a first end and a second end which have a different shape than one another, and the method includes forming the annularly arranged laminates by stacking the split core members so that each first end and each second end are equally arranged in its circumferential direction, punching the steel sheet in annular pattern in at least one annularly arranged laminate among the n number of annularly arranged laminates so that the first end and the second end of the yoke portion of the split core member are located in a reverse direction with respect to the first annularly arranged laminate among the n number of annularly arranged laminates, forming the annularly arranged laminate by stacking the split core members while maintaining the annular pattern, and forming m number of split cores by stacking the n number of annularly arranged laminates.

11. The method according to claim 1, wherein when n is 2, the stack thicknesses of the annularly arranged laminates are equal to each other, s is 12, and the number of poles of the rotor is 10, the method includes setting a rotational angle of the annularly arranged laminates to $\pi/2$.

12. The method according to claim 1, wherein when n is 3, the stack thicknesses of the annular arranged laminates are equal to each other, s is 12, and the number of poles of the rotor is 8, the method includes setting rotational angles of the other annularly arranged laminates with respect to one annularly arranged laminate among the annular arranged laminates to $\pi/6$ and $\pi/3$.

* * * * *